United States Patent [19]
Vaynshteyn

[11] Patent Number: 5,465,129
[45] Date of Patent: Nov. 7, 1995

[54] SPRING DRIVEN FILM TRANSPORT SYSTEM

[75] Inventor: Mikhail Vaynshteyn, Rochester, N.Y.

[73] Assignee: Eastman Kodak Company, Rochester, N.Y.

[21] Appl. No.: 215,239

[22] Filed: Mar. 21, 1994

[51] Int. Cl.⁶ ............................................. G03B 1/18
[52] U.S. Cl. .................................. 354/170; 354/213
[58] Field of Search ................................ 354/170, 171, 354/172, 173.1, 212, 213, 214

[56] References Cited

U.S. PATENT DOCUMENTS

| | | | |
|---|---|---|---|
| 651,118 | 6/1900 | Pascal et al. | 354/214 |
| 1,501,677 | 7/1924 | McMahon | 354/170 |
| 2,256,207 | 9/1941 | Leitz et al. | 354/171 |
| 3,036,507 | 5/1962 | Lossev | 354/172 |
| 3,237,542 | 3/1966 | Ataka | 354/170 |
| 4,351,595 | 9/1982 | Date et al. | 354/171 X |
| 5,221,940 | 6/1993 | Daitoku et al. | 354/173.1 |

FOREIGN PATENT DOCUMENTS

| | | |
|---|---|---|
| 1036042 | 8/1958 | Germany . |
| 1043076 | 11/1958 | Germany . |
| 305439 | 2/1955 | Switzerland . |

*Primary Examiner*—Michael L. Gellner
*Assistant Examiner*—J. K. Han
*Attorney, Agent, or Firm*—Peter J. Bilinski

[57] ABSTRACT

A film transport mechanism for a camera is powered by a clock-like spiral spring to advance the film. The spring is rewound during manual rewinding of the film into its canister. A separate belt and pulley drive carries the force of spring rewinding. The separate drive also actuates laterally movable (swinging) idler gears on pivot arms to disengage the canister film spool from the drive when the take-up spool is being driven in the forward, film winding, direction and to disengage the take-up spool from the drive when the film spool is being driven in the reverse, film rewind, direction. The film is thus not subjected to the forces required for rewinding the spring. An escapement mechanism is provided to control the speed of film transport to a relatively constant value in spite of the torque variations inherent in the spiral wound spring.

10 Claims, 2 Drawing Sheets

SPRING DRIVEN FILM TRANSPORT SYSTEM

FIELD OF THE INVENTION

This invention relates to camera spring film transport mechanisms and more particularly to mechanisms wherein the action of rewinding the film is effective to also rewind the spring that powers film advancement.

BACKGROUND OF THE INVENTION

It is known in the art to provide a camera with a spiral spring driven film transport mechanism and manually actuated rewinder. The spring drives the take-up spool to transport the film from a film spool in a canister and wind it upon the take-up spool. A manual rewinder is engagable with the film spool to rewind the film thereon and this action also rewinds the spring for use in winding a subsequent film.

One apparent problem of prior mechanisms is that during rewinding against the spring, the film is constantly under tension applied by the spring and the film is effectively used as a belt to carry force to the spring in order to rewind the spring. Also, the variable torque of the spiral spring may cause undesired variations in the rate of film transport.

SUMMARY OF THE INVENTION

The present invention overcomes the above stated problems.

According to the present invention, there is provided a film transport mechanism for a camera having a case enclosing a film spool and a take-up spool laterally aligned and mounted for rotation on spaced parallel axes, said mechanism comprising a take-up gear coaxially and drivingly connected with said take-up spool, said take-up gear being connectable with a forward idler gear driven by a winder gear for driving said take-up spool in a forward film winding direction for winding film thereon from said film spool, said mechanism further including said film transport mechanism being characterized by:

a spiral spring biasing said winder gear in a film winding direction wherein said forward idler gear, is disconnectable from said take-up gear so that the biasing force of the spiral spring may be removed from said take-up spool while the film is being rewound to said film spool.

The mechanism provides means for disconnecting the spring drive from a film carrying spool during unwinding, i.e. from the take-up spool during rewinding and the film canister spool during advancement, or forward winding, of the film from the canister, thus avoiding the application of movement resisting spring tension to the film. A separate interconnector, such as a belt drive, connects the spring and the film rewind crank, or rewinder, to accept the force of rewinding the spring and actuate the transport mechanism in both the winding and rewinding directions. A governor, such as an escapement mechanism, is provided to obtain a relatively even rate of film advance from the variable torque spiral spring.

These and other features and advantages of the invention will be more fully understood from the following detailed description of the invention taken together with the accompanying drawings.

DETAILED DESCRIPTION OF THE INVENTION

Figure 1:
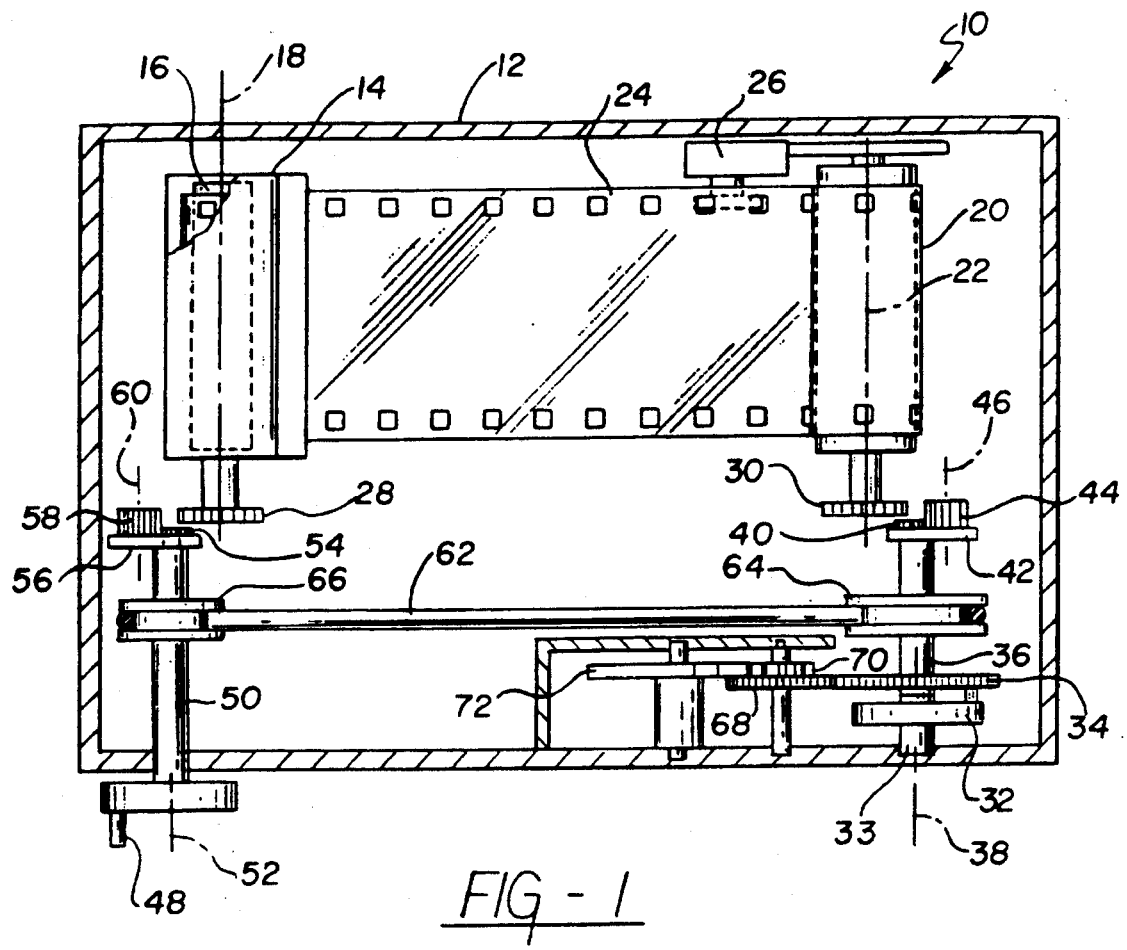
FIG. 1 is a schematic plan view of a camera having a spring film transport mechanism according to the present invention.

Referring now to the drawings in detail, numeral 10 generally indicates, in schematic form, a film camera having a case 12 enclosing a film canister 14 containing a film spool 16 rotatably mounted on an axis 18. A take-up spool 20 is rotatably mounted in lateral alignment with and on an axis 22 parallel with and spaced from the axis 18. In use, a photographic film 24 extends between the spools 16, 20 having edge perforations that are engaged by a conventional film metering device 26. The spools form parts of a film transport mechanism having driving elements to be subsequently described.

The film spool is drivably connected with a coaxial reverse gear 28 and the take-up spool is similarly connected with a coaxial take-up gear 30.

To drive the take-up spool 20 in a forward, film winding direction, there is provided a spiral spring 32 made of wound flat steel strip similar to a clock spring. Spring 32 is centrally mounted on a stub 33 grounded to the camera case 12 and the spring 32 engages at its outer end a primary gear 34. The primary gear 34 is fixed on a winder shaft 36 mounted for rotation on a winder axis 38 laterally spaced from the take-up spool axis 22. A winder gear 40 is fixed on the inner end of the winder shaft 36 near the take-up gear 30 for rotation with the winder shaft 36 and the primary gear 34. A winder arm 42 is pivotally mounted on the winder shaft 36 inwardly adjacent the winder gear 40. The winder arm 42 carries a forward idler gear 44 in constant engagement with the winder gear 40 and rotatable on a forward idler axis 46 spaced from the winder axis 38. The forward idler gear 44 is laterally movable into and out of driving engagement with the take-up gear 30 in response to pivoting movements of the winder arm 42.

To drive the film spool 16 in a reverse, film rewinding direction, there is provided a rewinder in the form of a manual crank 48. The crank 48 is externally fixed on a rewind shaft 50 mounted for rotation on a rewind axis 52 laterally spaced from the film spool axis 18. A rewind gear 54 is fixed on the inner end of the rewind shaft 50 near the reverse gear 28 for rotation with the rewind shaft 50 and the crank 48. A rewind arm 56 is pivotally mounted on the rewind shaft 50 inwardly adjacent the rewind gear 54. The rewind arm 56 carries a reverse idler gear 58 in constant engagement with the rewind gear 54 and rotatable on a reverse idler axis 60 spaced from the rewind axis 52. The reverse idler gear 58 is laterally movable into and out of engagement with the reverse gear 28 in response to pivoting movements of the rewind arm 56.

Rotation of the shafts 36 and 50 is related by an interconnector in the form of a belt 62, drivingly interconnecting a winder pulley 64 fixed on the winder shaft 36 with a rewind pulley 66 fixed on the rewind shaft 50. The winder pulley 64 is preferably of greater diameter than the rewind pulley 66 for a purpose to be subsequently made clear. The belt may be a timing belt or any other suitable belt-like member.

To maintain control of the speed of film advance at a relatively constant value in spite of the variable torque applied by the spiral spring 32, the primary gear 34 engages a secondary gear 68 which drivingly connects and rotates with a coaxial star gear 70. The star gear engages a pivotable clocking arm 72, forming with the star gear 70 an escapement mechanism that controls the rotational speed of the film transport mechanism to a relatively constant value over the spring travel from fully wound to its minimum torque at the end of film winding travel.

Figure 2:
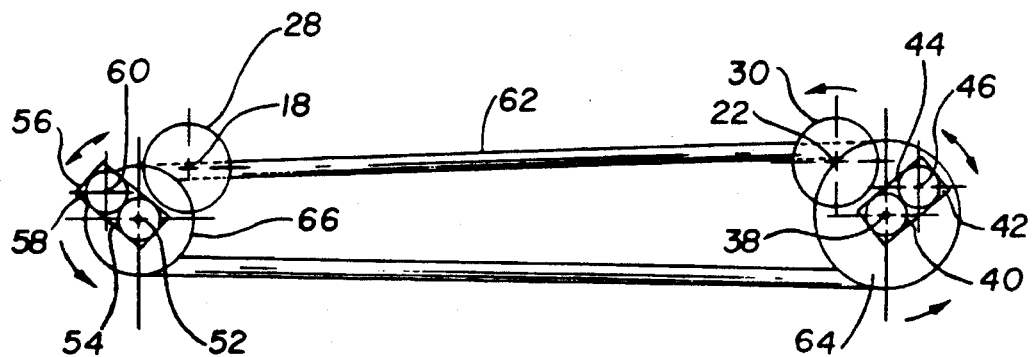
FIG. 2 is a schematic side view of the film transport mechanism of FIG. 1.
Figure 3:
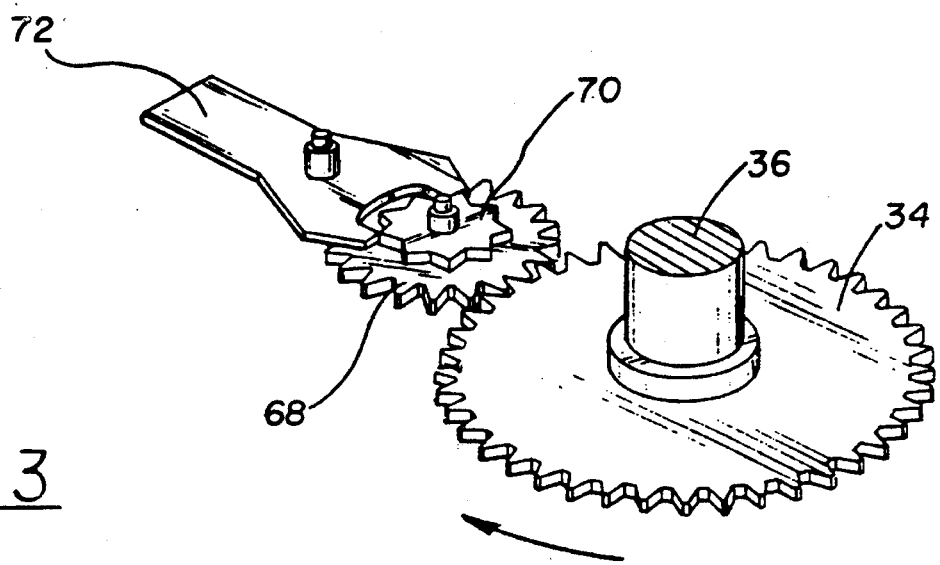
FIG. 3 is an inner perspective view of a spring winder and escapement mechanism.
Figure 4:
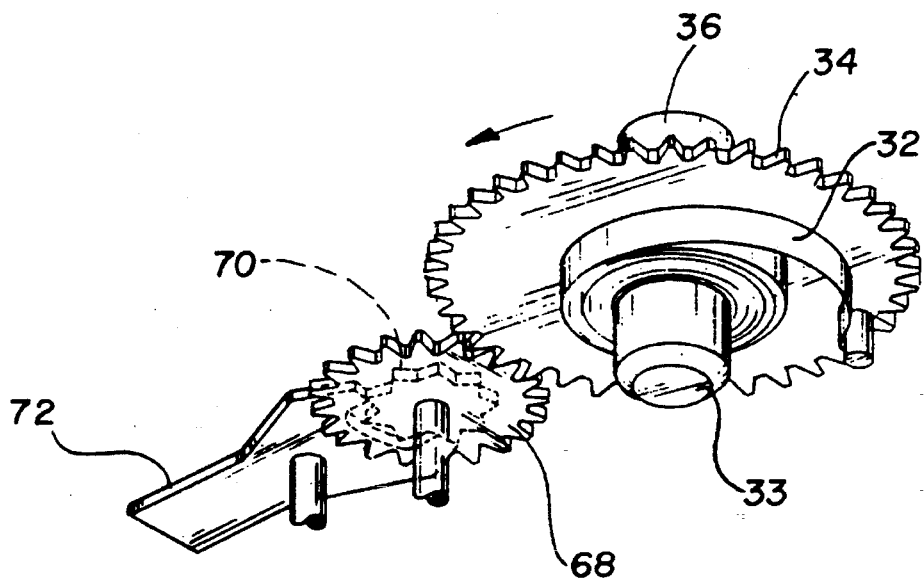
FIG. 4 is an outer perspective view of the winder and escapement mechanism shown in FIG. 3.

In operation, the spring 32 is prewound an amount sufficient to fully wind a canister of film for the camera onto the take-up spool. The spring biases the primary gear 34, winder shaft, 36 winder gear 40 and winder pulley 64 in a counterclockwise direction as shown in FIGS. 2 and 4. Initial rotation of the gear 40 pivots the forward idler gear 44 with the winder arm 42 counterclockwise until the gear 44 engages the take-up gear 30. At the same time, rotation of pulley 64 drives the rewind pulley 66, through the belt 62, in a counterclockwise direction as seen in FIG. 2. This drives the rewind shaft 50 and rewind gear 54 counterclockwise, pivoting the reverse idler gear 58 and rewind arm 56 counterclockwise and disengaging the gear 58 from the reverse gear 28. This allows free movement of the film spool 16 in the canister 14.

Further movement of the mechanism is then restrained until release of the film metering device 26. Then the spring rotates the primary gear 34, shaft 36 and gear 40, rotating idler gear 44 and turning its engaged take-up gear 30 counterclockwise. This rotates the take-up spool 20 in a forward, film winding direction, advancing the film to the next position where the metering device 26 stops further motion until it is again released. During each film advance motion, the speed of film travel is controlled by the escapement mechanism, made up of the escapement arm 72 actuated by the star gear 70 and driven by the primary gear 34 through the secondary gear 68. The inertia of the arm 72 is selected to provide the desired rate of film advance, which remains relatively constant in spite of the variation in spring torque.

Through consecutive advances, driven by the spring 32 and controlled by the film metering device 26, the film is moved to the end of its travel where it is almost fully wound onto the take-up spool. The film is then manually rewound into the film canister by turning the crank 48 in a clockwise direction. This rotates the rewind shaft 50 and rewind gear 54 clockwise in FIG. 2, pivoting the rewind arm in the same direction until the reverse idler gear 58 engages the reverse gear 60. At the same time, rewind pulley 66 through the belt 62 drives the winder pulley 64 clockwise, causing the winder arm 42 to pivot and carry the forward idler gear 44 laterally out of engagement with the take-up gear 30. The take-up spool 20 is thereby freed for rotation in the reverse, film rewind, direction (clockwise in FIG. 2). Thereafter, further rotation Of the crank 48 drives the rewind and reverse gears to rotate the film spool 16 to rewind the film thereon.

During manual rewinding, the pulleys 64, 66 continue to be driven clockwise as seen in FIG. 2, causing rotation of the primary gear 34 in the same direction to rewind the spirals spring 32. The manual rewind action is continued until the spring is fully wound and the rewinder crank 48 is prevented from further clockwise rotation. When the crank is released, the mechanism is then returned by the spring to the original position wherein the reverse idler gear 58 is disengaged from the reverse gear 28 and the forward idler gear 44 is engaged with the take-up gear 30. The mechanism is then ready to again advance a film when the metering device 26 is released. The rewind pulley 66 may be made smaller in diameter than the winder pulley 64, as was earlier noted, in order to assure that the film will be fully rewound into the canister 14 before the spiral spring 32 is fully rewound and further rotation of the rewinder crank 48 is prevented.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

Parts List 10. camera
12. case
14. film canister
16. film spool
18. axis
20. take-up spool
22. axis
24. film
26. film metering device
28. reverse gear
30. take-up gear
32. spiral spring
33. stub
34. primary gear
36. winder shaft
38. winder axis
40. winder gear
42. winder arm
44. forward idler gear
46. forward idler axis
48. crank (rewinder)
50. rewind shaft
52. rewind axis
54. rewind gear
56. rewind arm
58. reverse idler gear
60. reverse idler axis
62. belt
64. winder pulley
66. rewind pulley
68. secondary gear
70. star gear
72. escapement arm

What is claimed is:

1. A film transport mechanism for a camera having a case enclosing a film spool and a take-up spool laterally aligned and mounted for rotation on spaced parallel axes, said mechanism comprising a take-up gear coaxially and drivingly connected with said take-up spool, said take-up gear being connectable with a forward idler gear driven by a winder gear for driving said take-up spool in a forward film winding direction for winding film thereon from said film spool, a spiral spring biasing said winder gear in a film winding direction, and a rewinder connectable with said film spool for rewinding film thereon from the take-up spool, said mechanism being characterized by:

means interconnecting said winder gear and said rewinder for allowing film movement in a film advance and a film rewind direction wherein said use of said film rewinder in said rewind direction causes said spiral spring to rewind.

2. The mechanism recited as in claim 1, wherein said forward idler gear is mounted for rotation on a forward idler axis, said axis being laterally movable for moving said forward idler gear into and out of engagement with said take-up gear.

3. The mechanism as recited in claim 2, wherein said forward idler gear is rotatably mounted on a winder arm pivotally mounted on a winder shaft rotatable on a winder axis spaced from said forward idler axis, said winder gear being drivably mounted on said winder shaft and engaging said forward idler gear, said winder arm being positioned such that rotation of said winder shaft in a film winding direction pivots the winder arm to engage said forward idler gear with said take-up gear and rotate said take-up spool in said film winding direction.

4. The mechanism as recited in claim 1, including:

a reverse gear coaxially and drivingly connected with said film spool, said reverse gear being connectable with a reverse idler gear driven by a rewind gear drivingly connected with said rewinder for driving said film spool in a reverse, film rewinding direction, said reverse idler gear being disconnectable from said reverse gear so that the rewind gear may be disconnected from the film spool while the film is being wound onto the take-up spool.

5. The mechanism as recited in claim 4, wherein said forward idler gear is mounted for rotation on a forward idler axis, said forward idler axis being laterally movable for moving said forward idler gear into and out of engagement with said take-up gear and said reverse idler gear is mounted for rotation on a reverse idler axis, said reverse idler axis being laterally movable for moving said reverse idler gear into and out of engagement with said reverse gear.

6. The mechanism as recited in claim 5, wherein said forward idler gear is rotatably mounted on a winder arm pivotally mounted on a winder shaft rotatable on a winder axis spaced from said forward idler axis, said winder gear being drivably mounted on said winder shaft and engaging said forward idler gear, said winder arm being positioned such that rotation of said winder shaft in a film winding direction pivots the winder arm to engage said forward idler gear with said take-up gear and rotate said take-up spool in said film winding direction, and said reverse idler gear is rotatably mounted on a rewind arm pivotally mounted on a rewind shaft rotatable on a rewind axis spaced from said reverse idler axis, said rewind gear being drivably mounted on said rewind shaft and engaging said reverse idler gear, said rewind arm being positioned such that rotation of said rewind shaft in a film rewinding direction pivots the rewind arm to engage said reverse idler gear with said reverse gear and rotate said film spool in said film rewinding direction.

7. The mechanism as recited in claim 6, wherein said interconnector means continuously drivingly interconnects said winder shaft and said rewind shaft for contemporaneous rotation in film winding and film rewinding directions, such that only one of said take-up and film spools is connected to and driven by said transport mechanism at one time and rotation of said rewind shaft in said rewinding direction is operative to also rewind said spring.

8. The mechanism as recited in claim 7, wherein said interconnector means includes a belt connecting a winder pulley on said winder shaft with a rewind pulley on said rewind shaft, said winder pulley having a larger effective diameter than said rewind pulley so that full rewinding of the film onto said film spool will occur prior to full rewinding of said spiral spring.

9. The mechanism as recited in claim 6, including a film metering device to restrict continuous film transport in the film winding direction which, which when released allows said spiral spring to rotate said take-up spool in the film winding direction until a limit of film travel is reached.

10. The invention as recited in claim 1, wherein said rewinder includes a manually actuated member.

* * * * *